(12) United States Patent
Yoon (10) Patent No.: US 6,955,712 B2
(45) Date of Patent: Oct. 18, 2005

(54) PROTON-CONDUCTING POLYMER WITH ACID GROUPS IN SIDE CHAINS, PREPARATION METHOD THEREOF, POLYMER MEMBRANE MANUFACTURED USING THE POLYMER, AND FUEL CELL USING THE POLYMER MEMBRANE

(75) Inventor: Chong-bok Yoon, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 179 days.

(21) Appl. No.: 10/610,810

(22) Filed: Jul. 2, 2003

(65) Prior Publication Data

US 2004/0097695 A1 May 20, 2004

(30) Foreign Application Priority Data

Jul. 6, 2002 (KR) .................................. 10-2002-0039154

(51) Int. Cl.[7] ........................ B01D 53/22; B01D 69/04; B01D 71/64; C08L 79/08; H01M 8/10
(52) U.S. Cl. ............................... 96/14; 429/30; 429/33; 525/434; 525/436
(58) Field of Search .................................. 525/434, 436; 429/30, 33; 96/14

(56) References Cited

U.S. PATENT DOCUMENTS 6,245,881 B1    6/2001   Faure et al.

FOREIGN PATENT DOCUMENTS

JP            2002121281       4/2002

*Primary Examiner*—Ana Woodward
(74) *Attorney, Agent, or Firm*—Burns, Doane, Swecker & Mathis, LLP (57) ABSTRACT

A proton-conducting polymer, a preparation method thereof, a polymer membrane manufactured from the proton-conducting polymer, and a fuel cell having the polymer membrane are provided. The proton-conducting polymer contains an acid-bearable aromatic group covalently bonded to its polyimide backbone and a proton-conducting acid group attached to the aromatic group. A polymer membrane manufactured from the proton-conducting polymer has greater mechanical strength and ionic (protonic) conductivity than existing sulfonated polyimide membranes and thus improves the performance of fuel cells. In addition, the proton-conducting polymer membrane is low cost, enabling automobile fuel cells to be commercialized. Since the proton-conducting polymer membrane is less permeable to methanol, it can be used effectively for DMFCs without causing cell performance degradation.

21 Claims, 3 Drawing Sheets

FIG. 3 ly thermal stability, can be processed into a thin film# PROTON-CONDUCTING POLYMER WITH ACID GROUPS IN SIDE CHAINS, PREPARATION METHOD THEREOF, POLYMER MEMBRANE MANUFACTURED USING THE POLYMER, AND FUEL CELL USING THE POLYMER MEMBRANE

BACKGROUND OF THE INVENTION

This application claims priority from Korean Patent Application No. 2002-39154, filed on Jul. 6, 2002, in the Korean Intellectual Property Office, the disclosure of which is incorporated herein in its entirety by reference.

1. Field of the Invention

The present invention relates to a proton-conducting polymer, and more particularly, to a proton-conducting polymer with good mechanical properties and protonic conductivity and capable of effectively suppressing cross-over of methanol, a preparation method thereof, a polymer membrane manufactured using the proton-conducting polymer, and a fuel cell using the polymer membrane.

2. Description of the Related Art

Recently, with growing concerns about the environment and the exhaustion of energy resources, and the commercialization of fuel cell automobiles, there is an urgent need for the development of reliable, high-performance fuel cells that are operatable at an ambient temperature with high-energy efficiency and for the development of polymer membranes capable of increasing the efficiency of fuel cells.

Fuel cells are new power generating systems that convert energy produced through the electrochemical reactions of fuel and oxidative gas directly into electric energy. Such fuel cells can be categorized into fuel cells with molten carbonate salt, which are operable at a high temperature of 500–700° C., fuel cells with phosphoric acid, which are operable around 200° C., and alkaline electrolyte fuel cells and solid polymer electrolyte fuel cells operable between room temperature and 100° C.

SPE fuel cells include proton-exchange membrane fuel cells (PEMFCs) using hydrogen gas as a fuel source and direct methanol fuel cells (DMFCs) which generate power using liquid methanol directly applied to the anode as a fuel source.

SPE fuel cells, which are emerging as the next generation of a clean energy source alternative to fossil fueled engine, have high power density and high-energy conversion efficiency. In addition, SPE fuel cells are workable at an ambient temperature and are easy to hermetically seal and miniaturize, so they can be extensively applied to the fields of zero emission vehicles, power generating systems for house use, mobile telecommunications equipment, medical equipment, military equipment, equipment in space, and the like.

Figure 1:
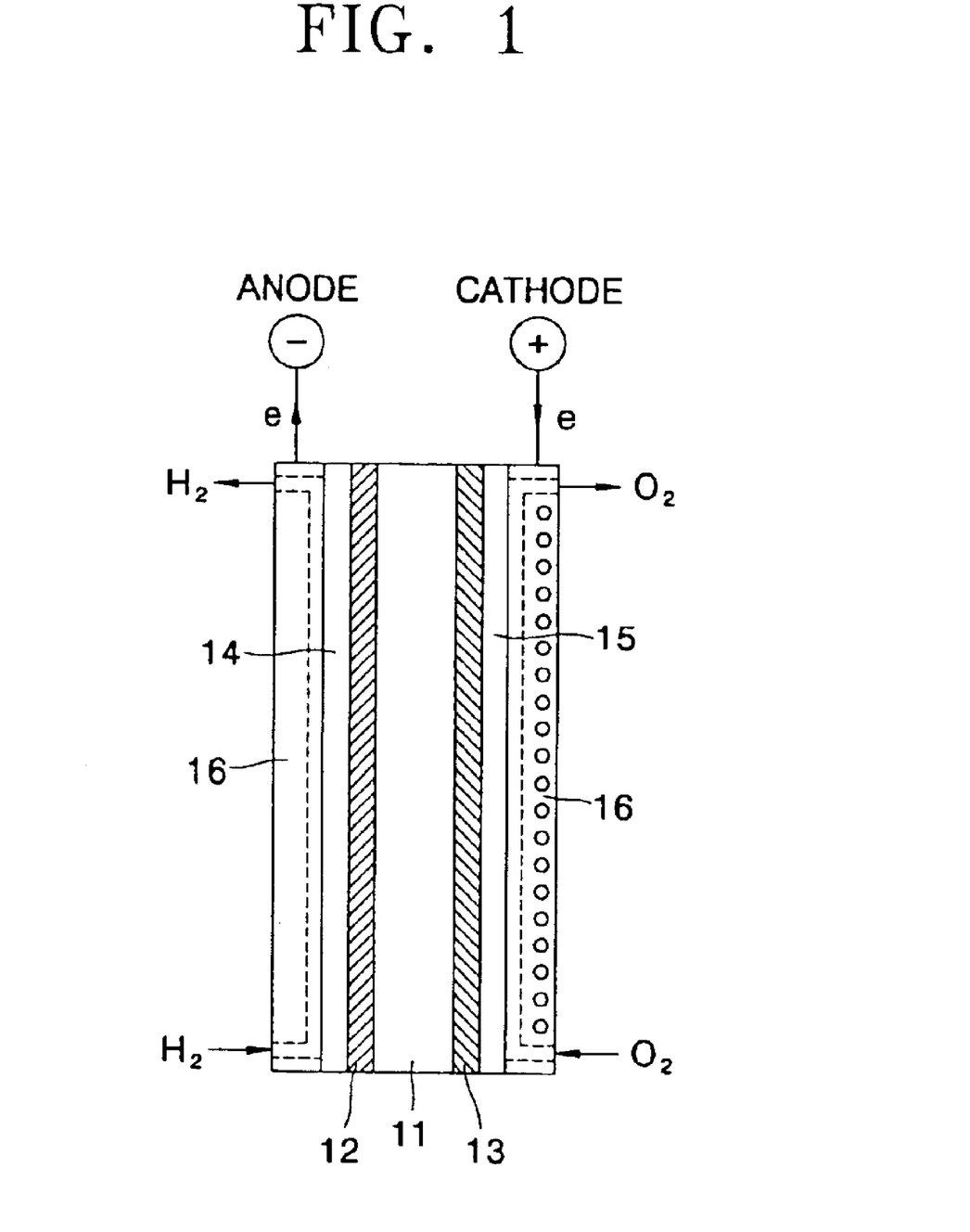
FIG. 1 illustrates the structure of a general proton exchange membrane fuel cell.

The basic structure of a PEMFC as a power generator producing a direct current through the electrochemical reaction of hydrogen and oxygen is shown in FIG. 1. Referring to FIG. 1, a PEMFC has a proton-exchange membrane 11 interposed between an anode and a cathode. The proton-exchange membrane 11 is formed of an SPE with a thickness of 50–200 μm. The anode and cathode includes respective anode and cathode backing layers 14 and 15 for supplying reaction gases, and respective catalyst layers 12 and 13, where oxidation/reduction of reaction gases occur, forming gas diffusion electrodes (hereinafter, the anode and cathode will be referred to as "gas diffusion electrodes"). In FIG. 1, reference numeral 16 denotes a carbon sheet having gas injection holes and acting as a current collector.

As hydrogen as a reactant gas is supplied to a PEMFC having such a structure described above, hydrogen molecules decompose into protons and electrons through oxidation reaction in the anode. These protons reach the cathode through the proton-exchange membrane 11. Meanwhile, in the cathode, oxygen molecules take the electrons from the anode and are reduced to oxygen ions. These oxygen ions react with the protons from the anode to produce water.

As shown in FIG. 1, in the gas diffusion electrodes of the PEMFC, the catalyst layers 12 and 13 are formed on the anode and cathode backing layers 14 and 15, respectively. The anode and cathode backing layers 14 and 15 are formed of carbon cloth or carbon paper. The surfaces of the anode and cathode backing layers 14 and 15 are treated for reaction gases and water to easily permeate into the proton-exchange membrane 11 before and after reaction.

DMFCs have a similar structure to the PEMFC described above, but use liquid methanol instead of hydrogen as a fuel source. As methanol is supplied to the anode, an oxidation reaction occurs in the presence of a catalyst to generate protons, electrons, and carbon dioxide. Although DMFCs has lower energy efficiency than PEMFCs, the use of liquid fuel in DMFCs makes their application to portable electronic devices easier.

Ion-conducting polymer membranes are mostly used for a proton exchange membrane interposed between the anode and the cathode of fuel cells. Polymers for ion-conducting polymer membranes requires high ionic conductivity, electrochemical stability, acceptable mechanical properties, thermal stability at working temperatures, the possibility of being processed into low-resistant thin films, and smaller degree of swelling when soaking up liquid, etc. Fluorinated polymer membranes having fluorinated alkylene in their backbone and sulfonic acid groups at the terminals of fluorinated vinylether side chains, such as Nafion by Dupont, are currently available for ionic-conducting membranes. However, such fluorinated polymer membranes are unsuitable for automobile fuel cells due to the high price and cause problems of cross-over of methanol and lower performance when used for DMFCs.

To address for the problems, there has been intensive research on a variety of polymers capable of giving electrolyte membranes suitable electrochemical properties and thermal stability. Representative examples of such polymers include heat-resistant aromatic polymers, such as polybenzimidazole, polyethersulfone, polyetherketone, etc. However, these aromatic polymers are too rigid to dissolve and to be processed into thin films.

U.S. Pat. No. 6,245,881 discloses a fuel cell with a sulfonated polyimide ion-conducting membrane. However, this sulfonated polyimide ion-conducting membrane has poor mechanical strength because it is manufactured through direct sulfonation to the polyimide backbone, which originally has a degree of mechanical strength. The poor mechanical strength of the sulfonated polyimide ion-conducting membrane causes difficulties in subsequent processes involved in the manufacture of fuel cells, for example, in the manufacture of a membrane-electrolyte assembly (MEA).

SUMMARY OF THE INVENTION

The present invention provides a proton-conducting polymer that has good electrochemical and mechanical properties and thermal stability, can be processed into a thin film with more ease, and is less permeable to methanol. The proton-conducting polymer also can be manufactured at low costs.

The present invention provides a preparation method of the proton-conducting polymer.

The present invention provides a polymer membrane made of the proton-conducting polymer alone or in combination with other polymers.

The present invention provides a fuel cell having the proton-conducting polymer membrane.

In accordance with an aspect of the present invention, there is provided a proton-conducting polymer having a repeating unit of formula (1) below:

(1)

where each of $A_1$ and $A_3$, which may the same or different, is a tetravalent group selected from the group consisting of at least one $C_6$–$C_{10}$ aromatic ring and $C_4$–$C_9$ heteroaromatic ring including one or more hetero atoms chosen from among S, N, and O; $A_2$ is a divalent group having at least one $C_6$–$C_{10}$ aromatic ring and/or aliphatic compound; $A_4$ is a trivalent or tetravalent group having at least one $C_6$–$C_{10}$ aromatic ring; $A_5$ is a divalent group having at least one $C_6$–$C_{10}$ aromatic ring; BH is at least one proton-bearable acid group selected from the group consisting of a sulfonic acid group, a phosphoric acid group, and sulfonyl (trifluoromethylsulfonyl) imide group; and n and m are integers from 0 to 20, which may be the same or different, and $n/n+m=0$–$0.95$ where $n+m\neq0$.

In accordance with another aspect of the present invention, there is provided a method of preparing a proton-conducting polymer, the method comprising: (a) reacting tetracarboxylic acid dianhydride monomers with diamine monomers to provide a polyimide; (b) reacting the polyimide with an aromatic hydroxy compound in the presence of trialkylphosphine and an azo compound and dissolving the reaction product in an organic solvent; and (c) adding an acid group donor into the solution from step (b).

In accordance with another aspect of the present invention, there is provided a polymer blend comprising the above-described proton-conducting polymer in an amount of 1–99% by weight based on the total weight of the polymer blend and a balance of other polymers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A proton-conducting polymer according to the present invention includes a repeating unit of formula (1) above. The proton-conducting polymer is a polyimide derivative with an acid-bearable aromatic group $A_5$ covalently bonded to the polyimide backbone and a proton-conducting acid group (BH) attached to the aromatic group $A_5$.

Examples of $A_1$ and $A_3$ in formula (1) above are illustrated in formula (2) below, examples of $A_2$ in formula (1) above are illustrated in formula (3) below, examples of $A_4$ in formula (1) above are illustrated in formula (4) below, and examples of $A_5$ in formula (1) above are illustrated in formula (5) below:

Formula (2)

-continued

-continued

Formula (3)

Formula (4)

-continued

-continued

Formula (5)

It is preferable that the ion-conducting polymer according to the present invention has a number average molecular weight of 5,000–1,000,000. The ion-conducting polymer has an equivalent weight of, preferably 250–2,500, and more preferably 400–1,200. If the equivalent weight of the ion-conducting polymer is less than 250, it is difficult to form a membrane with the polymer. If the equivalent weight of the ion-conducting polymer exceeds 2,500, a sufficient ionic conductivity is not ensured.

A preparation method of a proton-conducting polymer according to an embodiment of the present invention will be described.

First, tetracarboxylic acid dianhydride monomers are subjected to condensation polymerization with diamine monomers, as illustrated in reaction scheme (1) below, to provide a polyimide. Various kinds of diamine monomers are available for use with the tetracarboxylic acid dianhydride monomers.

Reaction scheme (1)

Examples of suitable diamine monomers useful in the present invention include 1,3-diaminobenzene, 1,4-diaminobenzene, 6-methyl-1,3-diaminobenzene, 2-methyl-1,3-diaminobenzene, 5-methyl-1,3-diaminobenzene, 4,4'-diamino-1,1'-biphenyl, 3,3',4,4'-diamino-dimethyl-1,1'-biphenyl, 4,4'-diamino-3,3'-dimethoxy-1,1'-biphenyl, 4,4'-diamino-3,3'-dichloro-1,1'-biphenyl, methylenebis(4,4'-benzeneamine), methylenebis(3,3'-benzeneamine), methylenebis(3-methyl-4,4'-benzeneamine), methylenebis(3-isopropyl-4,4'-benzeneamine), oxybis(4,4'-benzeneamine), oxybis(3,3'-benzeneamine), carbonylbis(4,4'-benzeneamine), carbonylbis(3,3'-benzeneamine), thiobis(4,4'-benzeneamine), thiobis(3,3'-benzeneamine), sulfonylbis(4,4'-benzeneamine), sulfonylbis(3,3'-benzeneamine), hydroxymethylenebis(4,4'-benzeneamine), hydroxymethylenebis(3,3-benzeneamine), difluoromethylenebis(4,4-benzeneamine), 1-methylethylidenebis(4,4'-benzeneamine), 1-trifluoromethyl-2,2,2-trifluoroethylidenebis(4,4-benzeneamine), 1,3-dioxyphenylenebis(3,3'-benzeneamine), 1,3-dioxyphenylenebis(4,4'-benzeneamine), 1,4-dioxyphenylenebis(3,3'-benzeneamine), 1,4-dioxyphenylenebis(4,4'-benzeneamine), 3,3'-diaminobenzailide, 3,4'-diaminobenzanilide, 3',4-diaminobenzanilide, 4,4'-diaminobenzanilide, bis(3-aminophenyl)dimethylsilane, bis(4-aminophenyl)dimethylsilane, 9-fluoro-9-ylidene bisphenylamine, 2,5-diaminophenyl, 2,4-diaminophenol, 3,3'-dihydroxy-4,4'-diaminophenyl, 3,3'-dihydroxy-5,5'-diaminophenyl, 3,3'-methylenebis(6-aminophenyl), 3,3'-methylenebis(5-aminophenol), 3,3'-isopropylidene(6-aminophenol), 3,3'-isopropylenebis(5-aminophenol), 3,3'-hexafluoroisopropylidene(6-aminophenol), 3,3'-hexafluoroisopropylidene(5-aminophenol), 3,3'-oxybis(6-aminophenol), 3,3'-oxybis(5-aminophenol), 3,3'-carboxybis(6-aminophenol), 3,3'-carboxybis(5-aminophenol), 3,3'-thiobis(6-aminophenol), 3,3'-thiobis(5-aminophenol), 3,3'-sulfonylbis(6-aminophenol), 3,3'-sulfonylbis(5-aminophenol), 3,3'-hydroxymethylenebis(6-aminophenol), 3,3'-hydroxymethylenebis(5-aminophenol), 2,4-diaminobenzenethiol, 2,5-aminobenzenethiol, etc.

Examples of suitable tetracarboxylic acid dianhydride monomers useful in the present invention include benzene-1,2,4,5-tetracarboxylic acid, benzene-1,2,3,4-tetracarboxylic acid, 1,1'-biphenyl 3,3',4,4'-tetracarboxylic acid, 1,1'-biphenyl-2,2',3,3'-tetracarboxylic acid, 1,1',1''-terphenyl-2',3',5',6'-tetracarboxylic acid, naphthalene-1,2,5,6-tetracarboxylic acid, naphthalene-2,3,6,7-tetracarboxylic acid, naphthalene-1,2,4,5-tetracarboxylic acid, naphthalene-1,4,5,8-tetracarboxylic acid, phenylene-3,4,9,10-tetracarboxylic acid, phenanthrene-1,8,9,10-tetracarboxylic acid, 4,4'-oxybis(benzene-1,2-dicarboxylic) acid, 4,4'-thiobis(benzene-1,2-dicarboxylic) acid, 4,4'-methylenebis(benzene-1,2-dicarboxylic) acid, 4,4'-sulfonylbis(benzene-1,2-dicarboxylic) acid, 4,4'-difuloromethylenebis(benzene-1,2-dicarboxylic) acid, 4,4'-carbonylbis(benzene-1,2-dicarboxylic) acid, 3,3'-carbonylbis(benzene-1,2-dicarboxylic) acid, 4,4-isopropylidenebis(benzene-1,2-dicarboxylic) acid, 4,4'-hexafluoroisopropylidenebis(benzene-1,2-dicarboxylic) acid, 4,4'-phenylene-1,3-bis(carbonylbenzene-1,2-dicarboxylic) acid, 4,4'-phenylene-1,4-bis(carbonylbenzene-1,2-dicarboxylic) acid, 4,4'-phenylene-1,4-bis(oxybenzene-1,2-dicarboxylic) acid, 4,4-isopropylidene-1,1-bis(phenylene-1,4-oxy)-bis(benzene-1,2-dicarboxylic) acid, pyrazine-2,3,5,6-tetracarboxylic acid, thiophene-2,3,4,5-tetracarboxylic acid, 3,3',4,4'-tetracarboxybenzanilide, furan-2,3,4,5-tetracarboxylic acid, etc.

After the reaction illustrated in reaction scheme (1) above, an acid-bearable aromatic group $A_5$ is bound to the backbone (I) of the polyimide and treated with an acid group donor to provide proton-conducting polymerimide (III), as illustrated in reaction scheme (2) below.

In reaction scheme (2) above, an available trialkylphosphine may have the same or different $C_1$–$C_{20}$ alkyl groups. Suitable examples of $A_5OH$, an aromatic hydroxy compound, include diphenylethanol, benzylalcohol, diphenylmethanol, 9-fluorenemethanol, 1-(9-fluorenyl)ethanol, 9-fluorenethanol, diphenylpropanol, triphenylethanol, triphenylmethanol, 2-indanol, phenetylalcohol, etc.

Examples of the acid group donor include chlorosulfonic acid, acetyl sulfonate, sulfur trioxide, phosphoric acid ($H_3PO_4$), etc. Examples of the azo compound include diethylazodicarboxylate (DEAD), bis(2,2,2-trichloroethyl)azodicarboxylate, diphenylazodicarboxylate, di-t-butylazodicarboxylate, dibenzylazodicarboxylate, diisoprotylazodicarboxylate, etc.

In particular, referring to reaction scheme (2) above, the hydroxy group of $A_5$ is covalently bound to the nucleophilic moiety of $A_4$ in the polyimide backbone (I) through a coupling reaction in the presence of a diazocompound and trialkylphosphin.

$A_5$ and $A_4$ are linked via an ether bond when the nucleophilic moiety of $A_4$ is —OH and via a sulfide bond when the nucleophilic moiety of $A_4$ is —SH. This covalent coupling reaction takes place at room temperature with high yield. The polyimide (II) with aromatic group $A_5$ is reacted with an acid group donor to attach an acid group to aromatic group $A_5$. The acid group donor gives the aromatic group in a side chain of the polyimide an acid group and thus provides ionic conductivity to a polyimide membrane.

A proton-conducting polymer membrane according to the present invention is manufactured from the above-described proton-conducting polymer or a polymer blend containing the above-described proton-conducting polymer by solvent casting or hot pressing, to have a desired thickness. The thickness of the proton-conducting polymer membrane according to the present invention ranges, preferably, from 5 μm to 200 μm.

A suitable polymer blend contains, in addition to the proton-conducting polymer according to the present invention, at least one polymer selected from the group consisting of polyurethane, polyetherimide, polyetherketone, polyetheretherketone, polyurea, polypropylene, polystyrene, polysulfone, polyethersulfone, polyetherethersulfone, polyphenylenesulfone, polyaramide, polybenzimidazole, poly(bisbenzoxazol-1,4-phenylene), poly(bisbenzo(bis-thiazol)-1,4-phenylene), polyphenyleneoxide, polyphenylenesulfide, polyparaphenylene, polytrifluorostyrene sulfonic acid, polyvinylphosphonic acid, and polystyrene sulfonic acid. A suitable polymer blend for a polymer membrane according to the present invention may contain the proton-conducting polymer according to the present invention in an amount of 1–99% by weight based on the total weight of the polymer blend.

A fuel cell according to the present invention comprises, in its unit cell, a cathode, an anode, and the above-described proton-conducting polymer membrane between the cathode and the anode. The fuel according to the present invention can be manufactured by general methods.

The present invention will be described in greater detail with reference to the following examples. The following examples are for illustrative purposes and are not intended to limit the scope of the invention.

EXAMPLE 1

Preparation of a Polyimide Derivative with a Sulfonated Side Chain

A two-neck flask equipped with a nitrogen inlet was charged with 4.86 g of 3,3'-dihydroxy-4,4'-diaminophenyl and 150 mL of anhydrous N-methyl-pyrrolidinone (NMP) and stirred to obtain a transparent solution. This transparent solution was cooled to 0° C. using an ice bath, 10 g of 4,4'-hexafluoroisopropylidenebis (benzene-1,2-dicarboxylic) acid dianhydride was added with stirring at room temperature over 24 hours. After an addition of 30 mL of xylene, the temperature of the solution was raised to 160° C. and reacted for 3 hours, followed by an addition of an aqueous methanol solution to obtain brown precipitates. The brown precipitates were washed several times with methanol. The washed precipitates were dissolved in tetrahydrofuran (THF) and reprecipitated with the aqueous methanol solution. The resulting brown precipitates were dried in a vacuum oven for 24 hours to provide a polymide with imide bonds forming its backbone.

1.0 g of the polyimide powder was mixed with 30 mL of THF in a flack by stirring to obtain a transparent solution. This transparent solution was stirred further for 30 minutes in a nitrogen atmosphere, and 1.26 g of triethylphosphin and 0.79 g of diphenylethanol were added. A solution of 0.8 g of diethylazodicarboxylate (DEAD) in 5 mL of THF was added into the mixture and left until a transparent solution appeared. After reaction at room temperature for 48 hours, an aqueous methanol solution was added to obtain yellow precipitates. The yellow precipitates were washed several times with methanol, dissolved in THF, and reprecipitated with the aqueous methanol solution. The resulting yellow precipitates were dried in a vacuum oven for 24 hours to provide a polyimide derivative with an aromatic side chain branching off from the polyimide backbone.

2.1 g of the yellow powder was mixed with 30 mL of THF in a flask by stirring to obtain a transparent solution. A solution of 0.51 g of concentrated sulfuric acid and 0.65 g of acetic acid anhydride in 5 mL of THF was slowly added into the transparent solution using a syringe and reacted at 60° C. for 8 hours. The resulting brown solution was slowly added into 150 mL of aqueous methanol solution to obtain brown precipitates. The brown precipitates were washed several times with methanol and dried in a vacuum oven for 24 hours to provide polyhydroxyimide diphenylsulfonate (PHIDPS) as a proton-conducting polyimide. The resulting PHIDPS has the following formula:

EXAMPLE 2

Preparation of a Polyimide Derivative with a Sulfonated Side Chain

A proton-conducting polyimide was prepared in the same manner as in Example 1, except that 2.79 g of 2,5-diaminophenol was used instead of 3,3-dihydroxy-4,4'-diaminophenyl. The proton-conducting polyimide has the following formula:

EXAMPLE 3

Preparation of a Polyimide Derivative with a Sulfonated Side Chain

A proton-conducting polyimide was prepared in the same manner as in Example 1, except that 5.17 g of 3,3-methylenebis(6-aminophenol) was used instead of 3,3-dihydroxy-4,4'-diaminophenyl. The proton-conducting polyimide has the following formula:

EXAMPLE 4

Preparation of a Polyimide Derivative with a Sulfonated Side Chain

A proton-conducting polyimide was prepared in the same manner as in Example 1, except that 7.56 g of 3,3-hexafluoroisopropylidene(6-aminophenol) was used instead of 3,3-dihydroxy-4,4'-diaminophenyl. The proton-conducting polyimide has the following formula:

EXAMPLE 5

Preparation of a Polyimide Derivative with a Sulfonated Side Chain

A proton-conducting polyimide was prepared in the same manner as in Example 1, except that 4.91 g of benzene-1,2,4,5-tetracarboxylic acid dianhydride was used instead of 4,4'-hexafluoromethylenebis(benzene-1,2-dicarboxylic) acid dianhydride. The proton-conducting polyimide has the following formula:

EXAMPLE 6

Preparation of a Polyimide Derivative with a Sulfonated Side Chain

A proton-conducting polyimide was prepared in the same manner as in Example 1, except that 6.04 g of naphthalene-1,4,5,8-tetracarboxylic acid dianhydride was used instead of 4,4'-hexafluoromethylenebis(benzene-1,2-dicarboxylic)

acid dianhydride. The proton-conducting polyimide has the following formula:

EXAMPLE 7

Preparation of a Polyimide Derivative with a Sulfonated Side Chain

A proton-conducting polyimide was prepared in the same manner as in Example 1, except that 7.25 g of 4,4'-carbonylbis(benzene-1,2-carboxylic) acid dianhydride was used instead of 4,4'-hexafluoromethylenebis(benzene-1,2-dicarboxylic) acid dianhydride. The proton-conducting polymer has the following formula:

EXAMPLE 8

Preparation of a Polyimide Derivative with a Sulfonated Side Chain

A proton-conducting polyimide was prepared in the same manner as in Example 1, except that 0.78 g of 9-fluorenemethanol was used instead of diphenylethanol. The proton-conducting polymer has the following formula:

EXAMPLE 9

Preparation of a Polyimide Derivative with a Sulfonated Side Chain

A proton-conducting polyimide was prepared in the same manner as in Example 1, except that 0.43 g of benzylalcohol was used instead of diphenylethanol. The proton-conducting polymer has the following formula:

EXAMPLE 10

Preparation of a Polyimide Derivative with a Sulfonated Side Chain

A proton-conducting polyimide was prepared in the same manner as in Example 1, except that 0.84 g of 2-fluorenethanol was used instead of diphenylethanol. The proton-conducting polymer has the following formula:

EXAMPLE 11

Preparation of a Polyimide Derivative Blend 1.0 g of the PHIDPS obtained in Example 1 was added into 15 mL of 1,4-dioxane and stirred to obtain a transparent solution. 50 mg of polyurethane (PU) (Techflex, Sigma Aldrich Co.) was added into the solution and stirred at room temperature for 24 hours. The resulting solution was filtered to provide a clear, brown solution.

EXAMPLE 12

Manufacture of a Proton-conducting Polymer Membrane 1.0 g of the PHIDPS obtained in Example 1 was dissolved in THF to obtain a transparent solution. This transparent solution was dried in a vacuum oven at 70° C. to manufacture a PHIDPS polymer membrane.

EXAMPLE 13

Manufacture of a Proton-conducting Polymer Membrane 1.2 g of the PHIDPS-PU blend obtained in Example 11 was dissolved in THF to obtain a transparent solution. This transparent solution was dried in a vacuum oven at 70° C. to manufacture a PHIDPS-PU polymer membrane.

COMPARATIVE EXAMPLE 1

250 g of m-cresol, 10 g of 4,4'-diamino-(1,1'-biphenyl)-2,2'-disulfonic acid, and 30 g of 5,5-oxybis(1,3-isobenzofurandione) were reacted in a 500-cm$^3$ reactor at 180° C. for 4 hours. The reaction product was cooled to 50 with stirring, followed by an addition of 13.4 g of 4,4-methylenebisbenzneamine, and reheating to 180° C. for polymerization. The reaction solution was cooled to room temperature to terminate the polymerisation and precipitated with methanol solution. The resulting precipitates were washed with methanol to provide a proton-conducting polymer having sulfonated polyimide backbone. A polymer membrane was manufactured using the proton-conducting polymer.

COMPARATIVE EXAMPLE 2

A polymer membrane was manufactured using Nafion 115 (available from Dupont).

Figure 2:
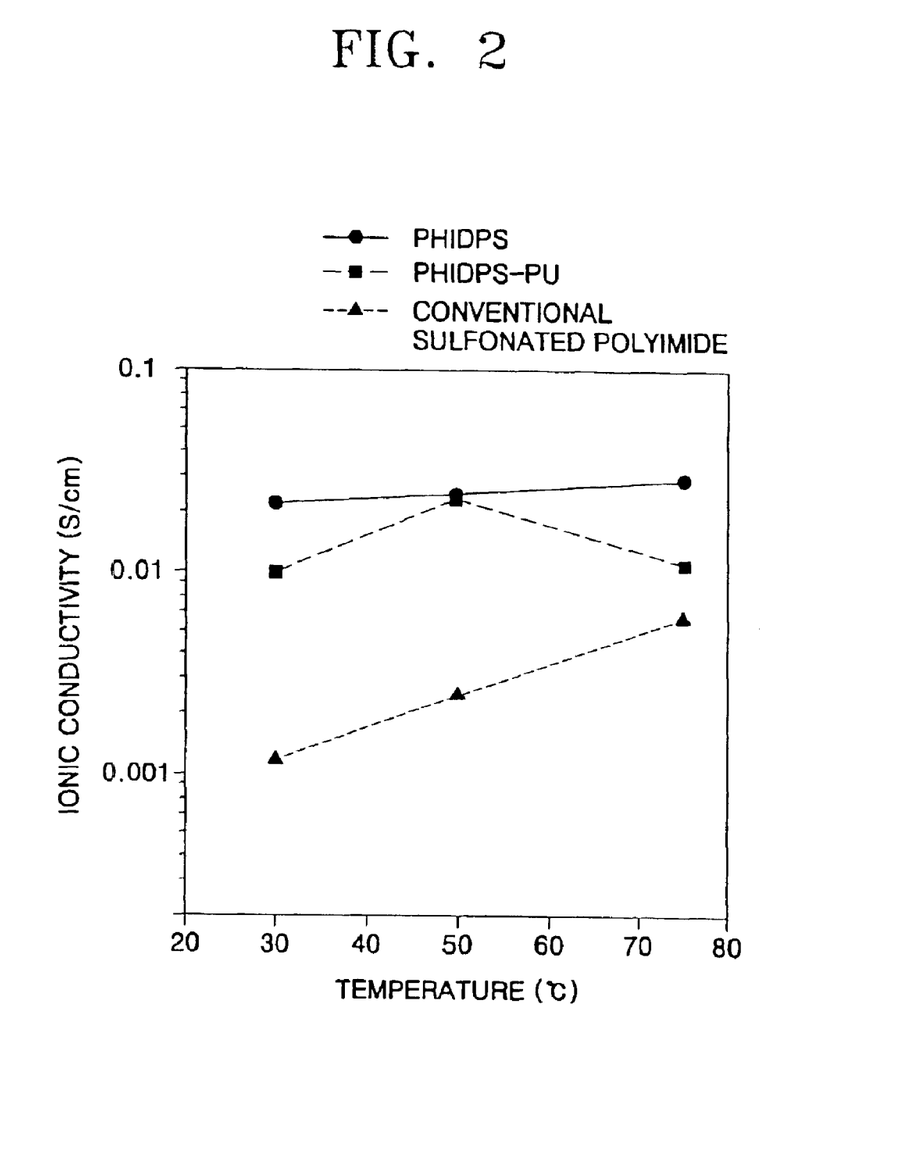
FIG. 2 is a graph of ionic conductivity versus temperature for the polymer membranes of Examples 13 and 14 according to the present invention and Comparative Example 1.

Ionic conductivity with respect to temperature was measured for the proton-conducting polymer membranes manufactured in Examples 12 and 13 and Comparative Example 1. The results are shown in FIG. 2. As is apparent from FIG. 2, the ionic conductivity of the polymer membranes according to the present invention is much better than the conventional polymer membrane. The greater ionic conductivity of the polymer membranes according to the present invention is attributed to more acid groups than the conventional polyimide membrane. Moreover, since the polyimide derivatives used to manufacture the polymer membranes according to the present invention contain acid groups in side chains, the backbone of the polyimide derivatives that determines the mechanical properties of membranes made therefrom is not affected by the acid groups so that the mechanical strength of the polymer membranes remain strong, even at a larger amount of acid groups.

Figure 3:
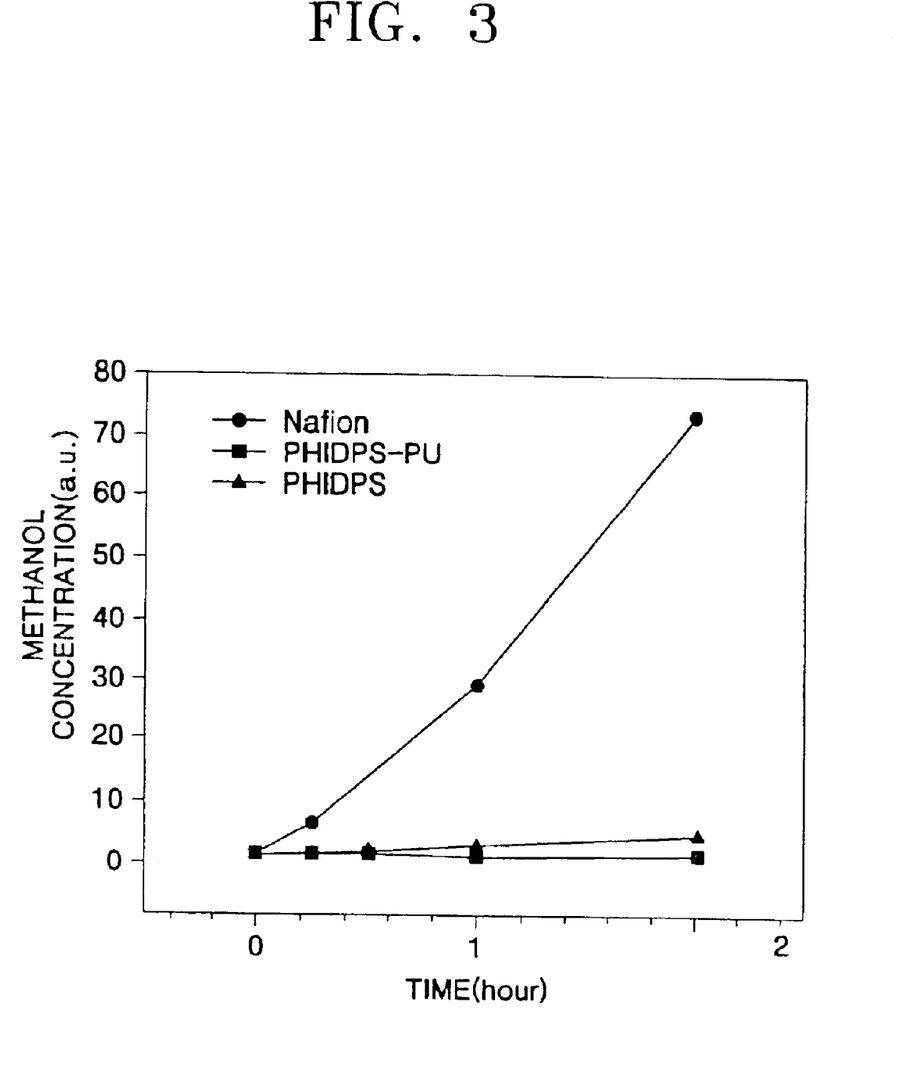
FIG. 3 is a graph of methanol concentration versus time for the polymer membranes of Examples 13 and 14 and Comparative Example 2.

Change in methanol cross-over with time was measured for the proton-conducting polymer membranes manufactured in Examples 12 and 13 and Comparative Example 2. The results are shown in FIG. 3. For Nafion 115 of Comparative Example 2, methanol crosses over the membrane toward the cathode, increasingly with time, so that the concentration of methanol near the cathode becomes greater. In contrast, the polymer membranes of Examples 12 and 13 undergo a small amount of methanol cross-over so that the poisoning of a cathode catalyst by methanol is markedly reduced. Therefore, the polymer membranes according to the present invention are compatible with a higher concentration of methanol.

As described above, a proton-conducting polymer membrane manufactured using a polyimide having acid groups in its side chains according to the present invention has greater mechanical strength and ionic (protonic) conductivity than conventional sulfonated polyimide membranes and thus improves the performance of fuel cells. In addition, the proton-conducting polymer membrane according to the present invention is low cost, enabling automobile fuel cells to be commercialized. Since the proton-conducting polymer membrane according to the present invention is less permeable to methanol, it can be used effectively for DMFCs without causing cell performance degradation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A proton-conducting polymer having a repeating unit of formula (1) below:

(1)

where each of $A_1$ and $A_3$, which may be the same or different, is a tetravalent group having at least one selected from the group consisting of $C_6$–$C_{10}$ aromatic ring and $C_4$–$C_9$ heteroaromatic ring including one or ore hetero atoms chosen from among S, N, and O; $A_2$ is a divalent group having at least one $C_6$–$C_{10}$ aromatic ring and/or aliphatic compound; $A_4$ is a trivalent a tetravalent group having at least one $C_6$–$C_{10}$ aromatic ring; $A_5$ is a divalent group having at least one $C_6$–$C_{10}$ aromatic ring: BH is at least one proton-bearable acid group selected from the group consisting of a sulfonic acid group, a phosphoric acid group, and sulfonyl(trifluoromethylsulfonyl) imide group; and n and m are integers from 0 to 20, which may be the same or different, and n/n+m=0~0.95 where n+m≠0.

2. The proton-conducting polymer of claim 1, having a number average molecular weight of 5,000–1,000,000, and an equivalent weight of 250–2,500.

3. A polymer blend comprising the proton-conducting polymer of claim 2 in an amount of 1–99% by weight based on the total weight of the polymer blend.

4. A polymer membrane manufactured from the proton-conducting polymer of claim 2.

5. A fuel cell comprising the polymer membrane of claim 4.

6. The proton-conducting polymer of claim 1, wherein $A_4$ and $A_5$ in said formula (1) are linked via an ether bond or a sulfide bond.

7. A polymer blend comprising the proton-conducting polymer of claim 6 in an amount of 1–99% by weight based on the total weight of the polymer blend.

8. A polymer membrane manufactured from the proton-conducting polymer of claim 6.

9. A fuel cell comprising the polymer membrane of claim 8.

10. The proton-conducting polymer of claim 1, comprising at least one repeating unit selected from formulae (2) through (11) below:

(2)

(3)

(4)

(5)

(6)

(7)

(8)

(9)

(10)

(11)

11. A polymer blend comprising the proton-conducting polymer of claim 10 in an amount of 1–99% by weight based on the total weight of the polymer blend.

12. A polymer membrane manufactured from the proton-conducting polymer of claim 10.

13. A fuel cell comprising the polymer membrane of claim 12.

14. A polymer blend comprising the proton-conducting polymer of claim 1 in an amount of 1–99% by weight based on the total weight of the polymer blend.

15. The polymer blend of claim 14, comprising, in addition to the proton-conducting polymer, at least one polymer selected from the group consisting of polyurethane, polyetherimide, polyetherketone, polyetheretherketone, polyurea, polypropylene, polystyrene, polysulfone, polyethersulfone, polyetherethersulfone, polyphenylenesulfone, polyaramide, polybenzimidazole, poly(bisbenzoxazol-1,4-phenylene), poly(bisbenzo(bis-thiazol)-1,4-phenylene), polyphenyleneoxide, polyphenylenesulfide, polyparaphenylene, polytrifluorostyrene sulfonic acid, polyvinylphosphonic acid, and polystyrene sulfonic acid.

16. A polymer membrane manufactured from the polymer blend of claim 14.

17. A fuel cell comprising the polymer membrane of claim 16.

18. A polymer membrane manufactured from the proton-conducting polymer of claim 1.

19. A fuel cell comprising the polymer membrane of claim 18.

20. A method of preparing a proton-conducting polymer, the method comprising:

(a) reacting tetracarboxylic dianhydride monomers with diamine monomers to provide a polyimide;

(b) reacting the polyimide with an aromatic hydroxy compound in the presence of trialkylphosphin and an azo compound and dissolving the reaction product in an organic solvent; and (c) adding an acid group donor into the solution from step (b).

21. The method of claim 20, wherein the acid group donor is at least one selected from the group consisting of chlorosulfonic acid, acetyl sulfonate, sulfur trioxide, and a phosphoric acid ($H_3PO_4$).

* * * * *